United States Patent
Thornton

(10) Patent No.: US 6,970,579 B1
(45) Date of Patent: Nov. 29, 2005

(54) ORIENTATION INVARIANT FEATURE DETECTION SYSTEM AND METHOD FOR UNSTRUCTURED LOW-QUALITY VIDEO

(75) Inventor: Susan M. Thornton, Pittsburgh, PA (US)

(73) Assignee: Sonic Foundry, Inc., Madison, WI (US)

(*) Notice: Subject to any disclaimer, the term of this patent is extended or adjusted under 35 U.S.C. 154(b) by 764 days.

(21) Appl. No.: 10/122,800

(22) Filed: Apr. 15, 2002

(51) Int. Cl.$^7$ .............................. G06K 9/00
(52) U.S. Cl. .................. 382/115; 382/162; 382/260; 382/308; 348/406.1; 348/407.1; 348/663; 375/240.16
(58) Field of Search .................. 382/115, 107, 243, 382/199, 236, 162, 168, 308; 328/260, 274; 348/97, 700, 452, 406.1, 407.1, 663; 375/240.1, 375/240.12, 240.16

(56) References Cited

U.S. PATENT DOCUMENTS 5,949,916 A * 9/1999 Chun .................. 382/261
6,421,384 B1 * 7/2002 Chung et al. .......... 375/240.09
6,678,009 B2 * 1/2004 Kahn .................... 348/569
6,681,032 B2 * 1/2004 Bortolussi et al. ....... 382/118

* cited by examiner

Primary Examiner—Bhavesh M. Mehta
Assistant Examiner—Sheela Chawan
(74) Attorney, Agent, or Firm—Foley & Lardner LLP

(57) ABSTRACT

A system and method for detecting features in video from business meetings and video teleconferencing systems can use color, motion, morphological (shape) filtering and a set of heuristic rules to determine possible features in the scene. One embodiment includes obtaining a first video frame of images and a second video frame of images, performing a luminance conversion on the first video frame of images and the second video frame of images, performing a motion filter operation on the converted first and second frames of images, performing a chrominance normalization on the second video frame of images, performing a color filter operation on the normalized second video frame of images, and processing the first and second frames of video images after the motion filter and color filter operations.

20 Claims, 8 Drawing Sheets

510 520

ORIENTATION INVARIANT FEATURE DETECTION SYSTEM AND METHOD FOR UNSTRUCTURED LOW-QUALITY VIDEO

GOVERNMENT LICENSE

The U.S. Government has a paid-up license in this invention and the right in limited circumstances to require the patent owner to license others on reasonable terms as provided for by the terms of Grant No. 70NANB8H4076 awarded by the National Institute of Standards and Technology.

FIELD OF THE INVENTION

| NAME | SIZE | DATE OF CREATION | |
|---|---|---|---|
| AFGVideo.cpp | 7KB | Feb. 11, 2002 | 10:37 AM |
| AFGVideo.h | 2KB | Feb. 11, 2002 | 10:37 AM |
| FaceUI.cpp | 9KB | Feb. 11, 2002 | 10:37 AM |
| FaceUI.h | 3KB | Feb. 11, 2002 | 10:37 AM |
| FaceUI.ic | 15KB | Feb. 11, 2002 | 10:37 AM |
| FaceUIDoc.cpp | 2KB | Feb. 11, 2002 | 10:37 AM |
| FaceUIDoc.h | 2KB | Feb. 11, 2002 | 10:37 AM |
| FaceUIView.cpp | 16KB | Feb. 11, 2002 | 10:37 AM |
| FaceUIView.h | 4KB | Feb. 11, 2002 | 10:37 AM |
| file_io.h | 6KB | Feb. 11, 2002 | 10:37 AM |
| MainFrm.cpp | 2KB | Feb. 11, 2002 | 10:37 AM |
| MainFrm.h | 2KB | Feb. 11, 2002 | 10:37 AM |
| MediaFaceDemo.cpp | 51KB | Feb. 11, 2002 | 10:37 AM |
| MediaFaceDemo.h | 1KB | Feb. 11, 2002 | 10:37 AM |
| MediaFaceVAF.dsp | 9KB | Feb. 11, 2002 | 10:37 AM |
| MediaFaceVAF.dsw | 1KB | Feb. 11, 2002 | 10:37 AM |
| Metadata.cpp | 2KB | Feb. 11, 2002 | 10:37 AM |
| Metadata.h | 2KB | Feb. 11, 2002 | 10:37 AM |
| resource.h | 3KB | Feb. 11, 2002 | 10:37 AM |
| StdAfx.cpp | 1KB | Feb. 11, 2002 | 10:37 AM |
| StdAfx.h | 2KB | Feb. 11, 2002 | 10:37 AM |
| vocr_det:h | 1KB | Feb. 11, 2002 | 10:37 AM |

The present invention relates generally to signal processing methods and systems. Further, an exemplary embodiment of the present invention relates to a computerized orientation invariant feature detection system and method for unstructured low-quality video.

BACKGROUND OF THE INVENTION

Feature detection and recognition systems such as face detection and recognition systems are utilized in a variety of security and identification applications. Feature detection and recognition systems typically receive data representing a video image of a face or other body part and determine data representing identification by comparing the video image to a library of data representative of faces or other body parts. It is desirable to use face recognition and detection systems to analyze video images from business meetings and video conference systems for security and other identification purposes. Video images from business meetings and video teleconference systems present a challenge to current commercially-available face detection and recognition systems.

Many conventional face detection and recognition systems are intended for higher quality, structured content, still images. For example, such systems often require a large video image of the face that is being identified and require that the face be imaged at a direct angle (i.e., an angle close to 90° with respect to the plane of the face). However, business meeting and video teleconference data tends to be unbounded, low-quality, continuous media which is difficult to use with commercially-available face detection and recognition systems. In these low-quality video environments, the faces in the video image are often extremely small (e.g., 20×20 pixels) and are rarely directed straight at the camera. Most commercial systems fail on such unstructured video images or scenes because they rely on the person looking straight at the video camera and require that each face be comprised of at least 80×80 pixels in the video frame.

FIG. 1 illustrates an example business meeting environment. FIG. 1 is a video image of a business environment which includes three participants sitting in various positions at a conference table and highlights some of the problems associated with using commercially available face recognition and detection systems with business meeting and video teleconference data. For example, a person 110 can have facial features obstructed from view by his or her hands. A person 120 can have a small face size viewed by the camera due to their distance from the camera. A person 130 can demonstrate a rotation of his or her head that takes the face in and out of a plane of rotation. Such obstructions, sizes, and unpredictable movements can be significant problems for feature based detection algorithms, such as face detection algorithms.

Thus, there is a need for a new feature detection method that combines color and motion filtering techniques with a post-processing filter that reduces the number of false detections produced by the overall system. Further, there is a need for an orientation invariant feature detection system and method for unstructured low-quality video. Even further, there is a need for a system and method for detection using low resolution imaging.

The teachings hereinbelow extend to those embodiments which fall within the scope of the appended claims, regardless of whether they accomplish one or more of the above-mentioned needs.

SUMMARY OF THE INVENTION

The present invention relates to an orientation invariant feature detection system and method for unstructured low-quality video. An exemplary embodiment relates to a method of detecting a human feature from a video. The method can include obtaining a first video frame of images and a second video frame of images, performing a luminance conversion on the first video frame of images and the second video frame of images, performing a motion filter operation on the converted first and second frames of images, performing a chrominance normalization on the second video frame of images, performing a color filter operation on the normalized second video frame of images, and processing the first and second frames of video images after the motion filter and color filter operations. The second video frame of images is later in time than the first video frame of images.

Another exemplary embodiment relates to a system operable to detect feature images in video. This system can include a central processing unit (CPU) and a storage device coupled to the CPU. The storage device has information stored therein for configuring the CPU to obtain video frames of images, perform a luminance conversion on a first and a second frame of the video frames of images, perform a motion filter operation on the converted first and second frames, perform a chrominance normalization on the second frame, perform a color filter operation on the normalized second frame, and process the first and second frames after the motion filter and color filter operations. The second frame is later in time than the first frame.

Another exemplary embodiment relates to an orientation invariant feature detection system for unstructured low-quality video. The system can include means for obtaining a first video frame of images and a second video frame of images, means for performing a luminance conversion on the first video frame of images and the second video frame of images, means for performing a motion filter operation on the converted first and second frames of images, means for performing a chrominance normalization on the second video frame of images, means for performing a color filter operation on the normalized second video frame of images, and means for processing the first and second frames of video images after the motion filter and color filter operations. The second video frame of images is later in time than the first video frame of images.

Other features and advantages of embodiments of the present invention will become apparent to those skilled in the art upon review of the following drawings, the detailed description, and the appended claims.

BRIEF DESCRIPTION OF THE DRAWINGS

The invention is illustrated by way of example and not limitation using the figures of the accompanying drawings, in which like references indicate similar elements and in which.

DETAILED DESCRIPTION OF EXEMPLARY EMBODIMENTS

An orientation invariant feature detection system and method for unstructured low-quality video are described. In the following description, for purposes of explanation, numerous details are set forth to provide a thorough understanding of exemplary embodiments of the invention. It will be evident, however, to one skilled in the art that the invention may be practiced without these details. In other instances, structures and devices are shown in diagram form to facilitate description of the exemplary embodiments. For example, the system is embodied below as a face detection system, however, the system can be modified to recognize any body part or member, such as but not limited to hands, ears, noses, etc.

In at least one embodiment, a computer system is used which has a central processing unit (CPU) that executes sequences of instructions contained in memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. In further embodiments, several computers or servers can cooperate to perform the face detection operation. Thus, the embodiments described herein are not limited to any specific combination of hardware circuitry and software, nor to any particular source for the instructions executed by the computer system.

Figure 1:
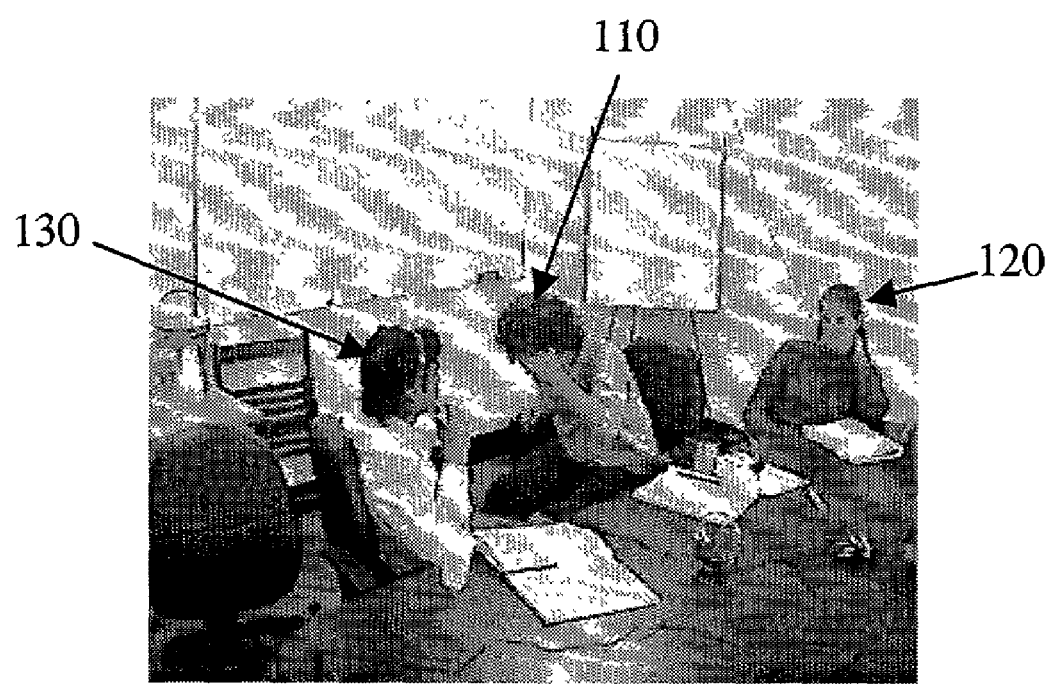
FIG. 1 is a diagrammatic representation of a typical business meeting scheme having unstructured participants due to obstruction of facial features with hands, the small size of the faces, and the in- and out-of-plane rotation of the heads.
Figure 2:
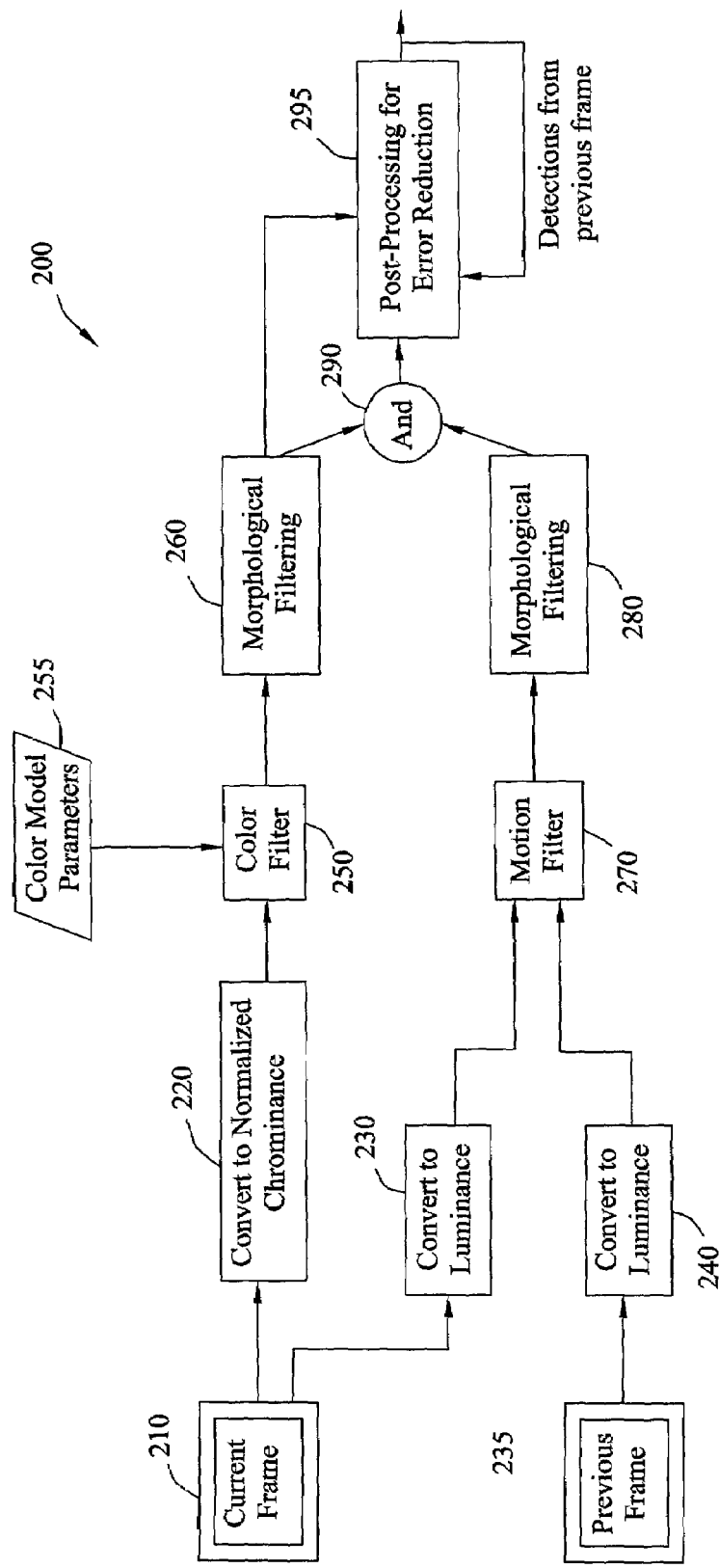
FIG. 2 is a flow diagram of a feature detection scheme that combines color and motion filtering techniques with a post-processing filter in accordance with an exemplary embodiment.

FIG. 2 illustrates a flow diagram 200 depicting an exemplary method of detecting a facial image captured in a video. Flow diagram 200 illustrates by way of example some operations that may be performed. Additional operations, fewer operations, or combinations of operations may be utilized in various different embodiments.

A current video frame 210 can be taken from a media device or storage device and converted to normalized chrominance in a conversion operation 220. Normalized chrominance refers to removing brightness from an image to be able to make color comparisons. In an exemplary embodiment, normalized chrominance conversion can be carried out as follows:

Using raw RGB (red, green, blue) data from current video frame 210, the red and green chrominance components can be computed using:

$$C_{R,ij} = \frac{R_{ij}}{R_{ij} + G_{ij} + B_{ij}} \quad \text{(Eq. 1)}$$

$$C_{G,ij} = \frac{G_{ij}}{R_{ij} + G_{ij} + B_{ij}} \quad \text{(Eq. 2)}$$

The normalized values $C_{R,ij}$ and $C_{G,ij}$ can effectively eliminate the luminance. Letting each pixel in the image be represented by the two-dimensional vector $\bar{p}_{ij}=[C_{R,ij}\ C_{G,ij}]^T$ skin color can be modeled using a Gaussian distribution with mean, $\mu_S$, and covariance, $\Sigma_S$ where:

$$\bar{\mu}_s = \frac{1}{NM} \sum_{i=1}^{N} \sum_{j=1}^{M} \bar{p}_{ij} \quad \text{(Eq. 3)}$$

$$\Sigma_s = \frac{1}{NM} \sum_{i=1}^{N} \sum_{j=1}^{M} \overline{p}_{ij} \overline{p}_{ij}^T \qquad \text{(Eq. 4)}$$

Figure 3:
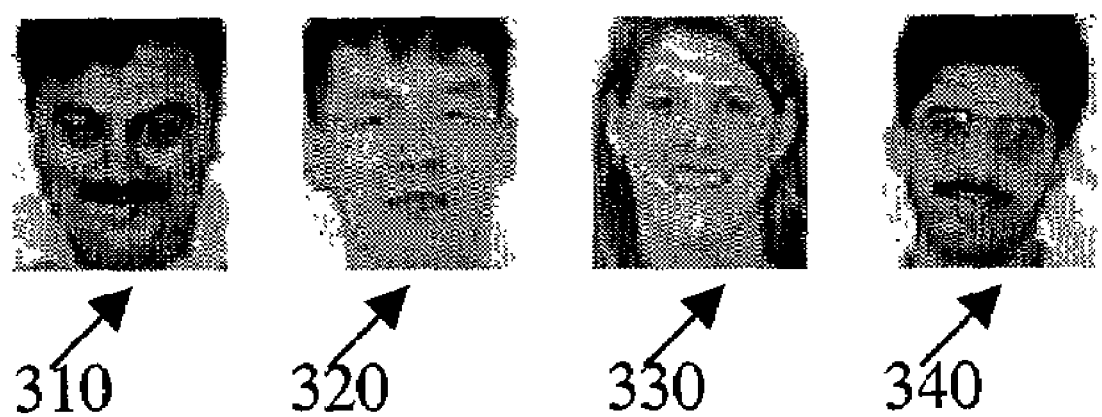
FIG. 3 is an illustration of individuals in a captured video image where the individuals have differences in perceived skin tone.

A skin model mean and covariance can be obtained from samples. By way of example, FIG. 3 illustrates sample faces 310, 320, 330, and 340, each having differences in perceived skin tone. Perceived skin tone of an individual can be a combination of luminance and chrominance components. It has been found that the luminance component, or the intensity of light per unit area of a source, makes individuals appear differently. Equations 3 and 4 are exemplary equations and can be modified without departing from the scope of the invention. Various filters and mathematical formulas can be applied to the results of equations 3 and 4 to alter, transform, or convert the data to optimize determince.

Figure 4:
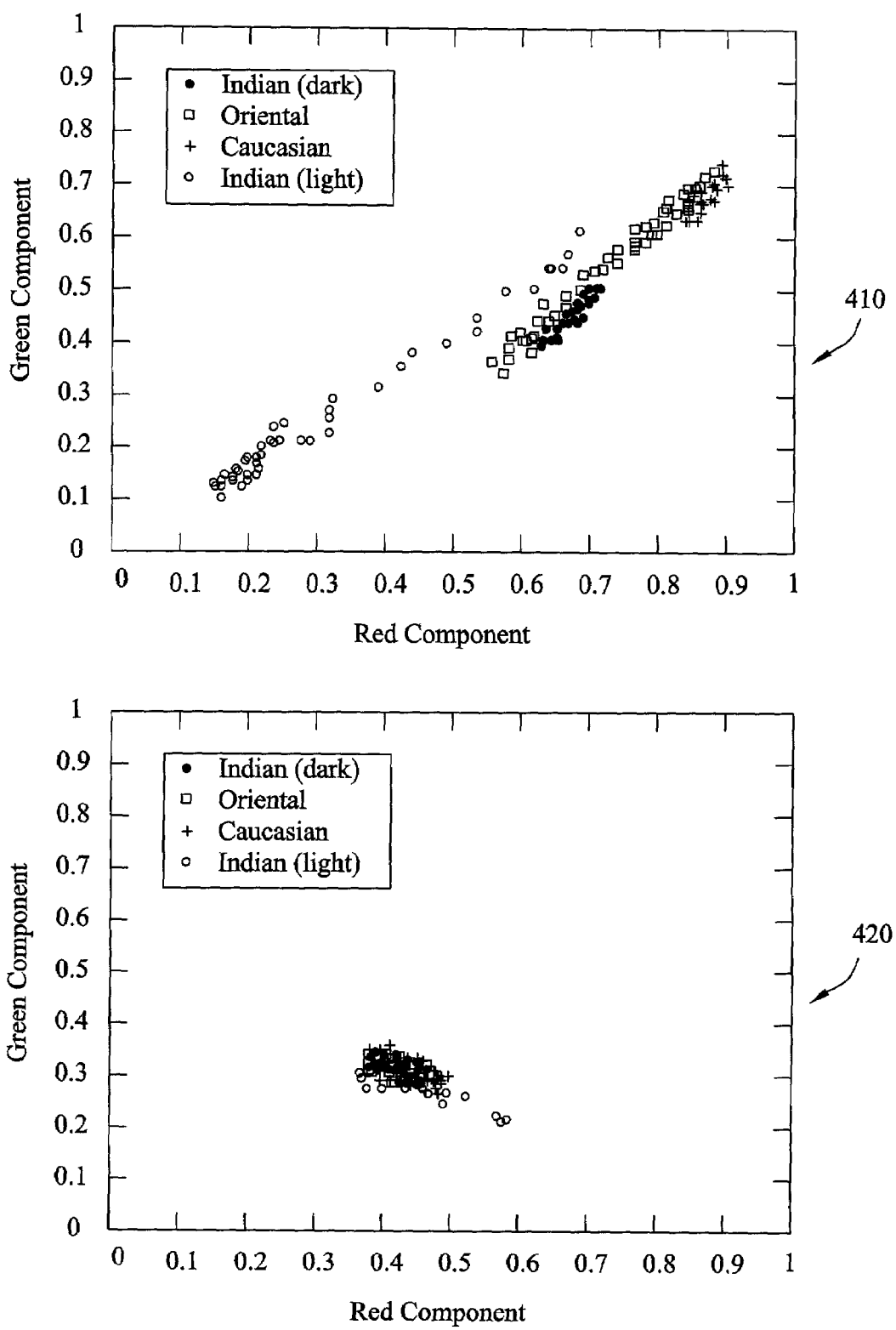
FIG. 4 is a pair of graphs depicting plots of red vs. green components of skin colored pixels.

FIG. 4 illustrates a luminance graph 410 and a chrominance graph 420 for a variety of images of skin color types. Luminance graph 410 plots red vs. green components of skin colored pixels in an image without compensating for luminance. Red and green are only examples and other colors could be used in addition to or in lieu of red and green. Chrominance graph 420 plots red vs. green components of skin colored pixels in an image with the luminance component removed. Luminance graph 410 and chrominance graph 420 contains points for human skin color typically associated with, for example, Dark Indian (solid dot), Oriental (hollow dot), Caucasian (a square), and Light Indian (a triangle). Note that chrominance graph 420 shows that removing luminance eliminates variation between skin colored pixels of different skin types. Thus, advantageously, chrominance can be used to detect human skin color and luminance can be used to determine variations in perceived human skin color.

Referring again to flow diagram 200, once current frame 210 is converted to normalized chrominance in conversion operation 220, a color filtering operation 250 can be applied using color model parameters 255.

Color filtering operation 250 can involve determining pixels that contain skin color by applying a distance filter at every pixel location in the image. Color filtering operation 250 can involve using a single hypothesis test or the Mahalanobis distance. A single hypothesis test can be useful when trying to distinguish one well-defined class from a multitude of other classes. In the case of skin color filtering, the single hypothesis attempts to distinguish or locate pixels displaying skin tone from all other colors represented in the scene.

In an exemplary embodiment, the single hypothesis test of color filtering operation 250 can involve measuring the distance of the color vector, at each pixel, from the target mean (normalized by the target covariance matrix), and applying a threshold to determine whether the pixel does or does not represent skin color. Using the Gaussian statistics derived from the sample images of FIG. 3, the normalized distance of $\overline{p}_{ij}$ from the skin color mean can be represented:

$$D = (\overline{p}_{ij} - \overline{\mu}_s)^T \Sigma_s^{-1} (\overline{p}_{ij} - \overline{\mu}_s). \qquad \text{(Eq. 5)}$$

The smaller the value of D, the more likely it is that the pixel contains skin color. A threshold can be chosen such that any value of D below the threshold is called skin color and any value of D above the threshold is eliminated.

Figure 5:
FIG. 5 is a diagrammatic representation of a skin filter output with circles highlighting areas where human skin is detected in accordance with an exemplary embodiment.
Figure 5:
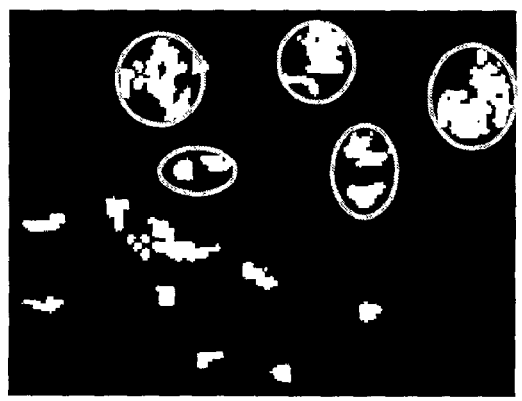

By way of example, FIG. 5 illustrates a video frame 510 and a corresponding skin filter output 520. White regions in skin filter output 520 indicate regions that are probably human skin while all other locations are set to black. False detections or detections that are not actually human skin can include clutter on a table, such as paper, that have similar coloring as human skin. Business meeting scenes tend to be highly cluttered which often makes it difficult to choose an appropriate threshold for the filter.

In FIG. 5, circles indicate detected regions that truly represent human skin. It can be seen that using only skin color to locate individuals in the scene can lead to several false detections since other miscellaneous items in the scene have color similar to skin tone. Furthermore, in a face detection system only individual faces are desired, not arms and hands, which are less readily discernable based solely on skin filtering results.

Referring again to flow diagram 200, current video frame 210 can be taken and converted to luminance in a luminance conversion operation 230. Luminance conversion refers to looking at brightness in an image rather than color. In an exemplary embodiment, luminance conversion can be carried out by determining intensity of pixels in an image.

A previous video frame 235 can also be taken and converted to luminance in a luminance conversion operation 240. After luminance conversion operations 230 and 240, current video frame 210 and previous video frame 235 can be received by a motion filter 270. Motion filter 270 can detect movement by comparing images captured by a camera at different points in time. In a setting where the scenery is constant and only people are moving, lack of movement can be an indicator that an object with luminance similar to the luminance of human skin is, nevertheless, not part of a person because it is stationary.

In an exemplary embodiment, motion filter 270 detects object motion by computing intensity differences between two frames of video. By way of example, if a background is fixed and lighting remains relatively constant, such as in a corporate office setting, major intensity differences result from human movement.

Figure 6:
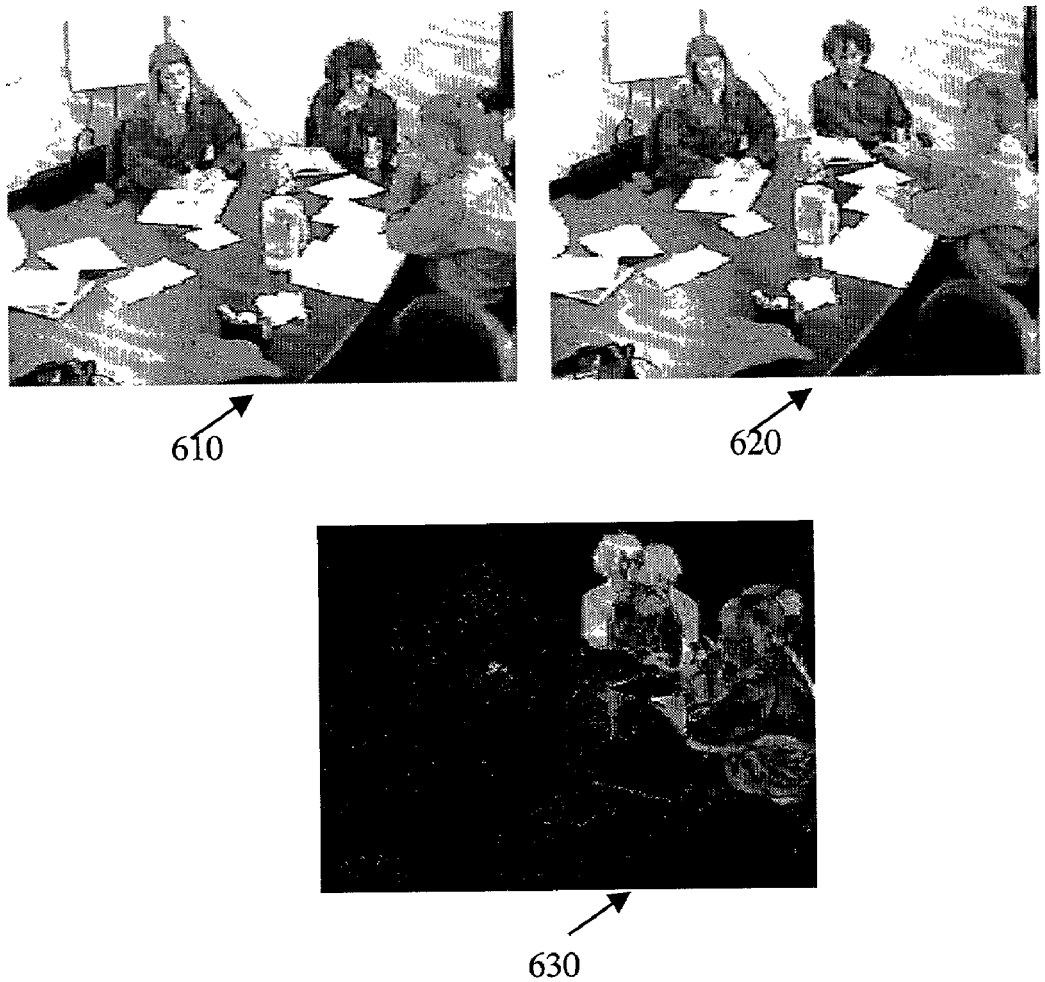
FIG. 6 is a diagrammatic representation of the difference between two frames spaced 10 frames apart in which, due to the fixed background, the only significant intensity differences are due to human motion.

By way of example, FIG. 6 illustrates a first video frame 610, a second video frame 620, and an intensity comparison 630. First video frame 610 and second video frame 620 are spaced 10 frames apart. White regions in intensity comparison 630 indicate regions in first video frame 610 and second video frame 620 in which significant intensity differences exist. Notably, intensity differences are present both where the individual was located (in first video frame 610) and in the region to which the individual moved (in second video frame 620). Used alone, therefore, intensity comparison for motion detection can lead to false detections of faces at old locations. However, when combined with the results of a color filter, many false detections can be eliminated.

In an exemplary embodiment, unlike detectors that use frame differencing to detect objects in motion, there is no need for a selection of a reference frame. Reference frames typically require video be taken prior to individuals being on the scene. Such prior preparation can be inconvenient and limiting. Instead, first video frame 630 can be used as a previous frame of video for reference.

Referring again to FIG. 2, after color filtering operation 250, a morphological filtering operation 260 can be performed to focus the topology or structure of objects in current video frame 210. Also, after motion filter 270, a morphological filtering operation 280 can be performed to focus the topology or structure of objects in the combined images of current video frame 210 and previous video frame 235. Morphological filtering operations 260 and 280 can include dilation (i.e., expansion) and erosion (i.e., shrinking). In an exemplary embodiment, 5×5 square structuring element can be used when performing dilation and erosion.

Morphological filtering operation 280 groups connected detections into regions and counts the number of pixels in each region. Only regions with a certain minimum number of pixels are retained as possible face locations. A minimum number of pixels is used in an exemplary embodiment under the assumption that regions with less than a minimum number of pixels are likely false positives, including hands, arms, or other false results.

Morphological filtering can include a sequence of dilation and erosion filters to eliminate holes in the regions, as well as to connect separate regions that are located extremely close together. In an exemplary embodiment, the sequence used is dilation followed by erosion followed by another dilation. A dilation followed by an erosion, referred to as a closing operation, blocks up narrow channels and small holes. A final dilation expands the detected objects to ensure that the entire skin region of the face is included in the detection.

Morphological filtering operations 260 and 280 can include morphological cleaning to eliminate single pixel detections and morphological labeling to group connected detections into sections. Morphological filtering operations 260 and 280 can also include closing or dilation followed by erosion to eliminate small holes in detection maps and to connect sections located close to each other.

An AND operation 290 can be performed to combine information from color and motion filtering operations. Specifically, in an exemplary embodiment, output from morphological filtering operations 260 and 280 are combined using AND operation 290. A post-processing operation 295 can be performed on the output of morphological filtering operation 260 and operation 290. Post-processing operation 295 can provide error reduction, eliminating false detections by applying a set of heuristic rules about faces in a given setting. For example, a business meeting/teleconferencing scene can have heuristic rules such as the following.

First, a business scene heuristic rule can be that faces cannot overlap with one another vertically (i.e., one face cannot be above another face). An algorithm in post-processing operation 295 can assume that detected regions that lie below other detected regions are either an individual's hands or arms.

Second, a business scene heuristic rule can be that, to be considered part of a face, detected regions must be at least some minimum number of pixels in size. If they are not, they are considered to be hands, arms, or other miscellaneous objects.

Another business scene heuristic rule can be that, if a face is detected in a previous frame, and that region is detected by the color filter in the current frame, but not the motion filter; the face location is retained as a detection in the current frame. This prevents individuals that were previously detected from being eliminated because they did not move significantly.

Another business scene heuristic rule can be that faces tend to have aspect ratios that are longer than they are wide. In addition, in business meetings and teleconference video, human faces tend not to have in-plane rotation greater than 45 degrees. Other heuristic rules can be established for business scenes or any other scene.

Figure 7:
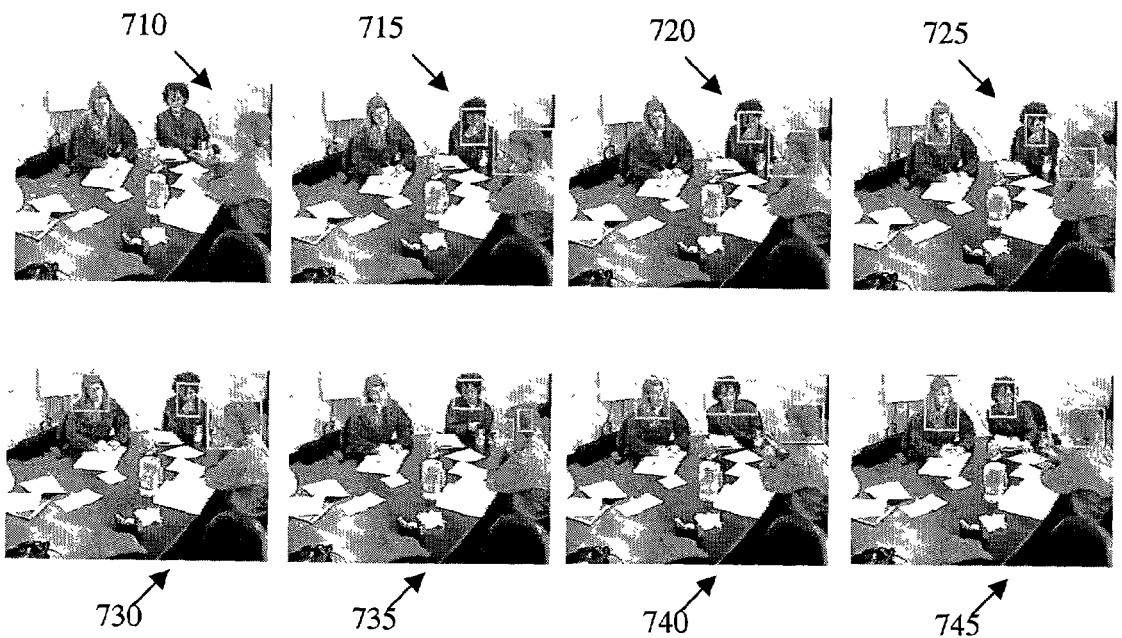
FIG. 7 is an illustration of exemplary video frames and results of a face detector system combining color, motion, and morphological filtering with a set of heuristic rules to locate faces in low quality unstructured video.

FIG. 7 illustrates video frames 710, 715, 720, 725, 730, 735, 740, and 745, depicting results of an exemplary method of detecting a facial image captured in a video as described with reference to FIG. 2. Advantageously, the exemplary method combines color filtering, motion detection, morphological filtering and heuristic rules. In an exemplary embodiment, detection does not begin until after at least 2 frames are received, such as video frames 710 and 715. Graphical boxes are imposed on the video frames to locate human faces. For example, video frame 745 includes graphical boxes over each of the three persons in the business meeting.

Figure 8:
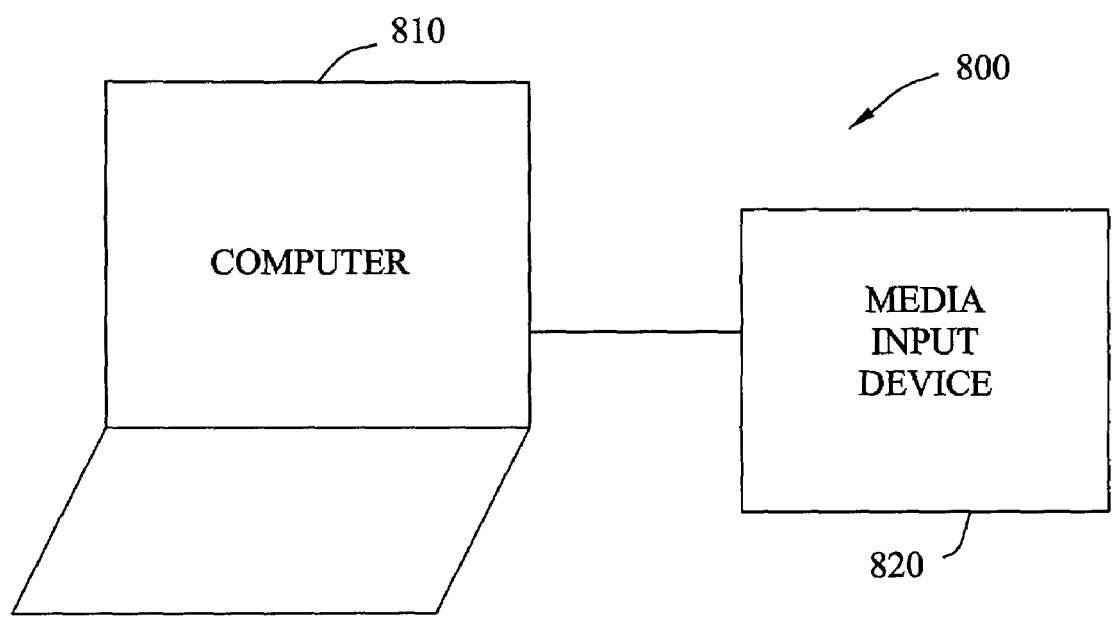
FIG. 8 is a diagrammatic representation of an exemplary system for facial detection in video images in accordance with an exemplary embodiment.

FIG. 8 illustrates a face detection system 800 having a computer 810 and a media device 820. Computer 810 can be any of a variety of computing devices, including a personal computer (PC), a laptop computer, a handheld device, a personal digital assistant (PDA), a wireless application protocol (WAP) device, or any other computing device. Computer 810 can include a memory and a central processing unit (CPU). Computer 810 can include a display or be coupled to a display.

Media device 820 can be any of a variety of media capture devices, such as a video camera, a personal computer camera, a digital camera, or any other such device providing video feed. In one embodiment, computer 810 and media device 820 are integrated into one device.

Media device 820 can capture and store images into computer readable files stored in a memory which is accessible by computer 810. Such files can be stored electronically in any of a variety of data formats, such as a DV format, MPEG format, QUICKTIME format, audio video interleave (AVI) format, or any format which is readable by a computing device, such as a personal computer (PC) or a hand held personal digital assistant (PDA). In an exemplary embodiment, media device 820 can be configured to capture other biometric data, such as voice.

In an exemplary embodiment, media device 820 is coupled to computer 810 via a network, such as the Internet, an extranet, a virtual private network (VPN), or any other network. Media device 820 can be one of multiple media devices used for a network meeting carried out over a network.

Computer 810 can include programmed instructions stored in memory to perform filtering and processing operations necessary to carry out the methods described with reference to FIGS. 1–7. In an alternative embodiment, computer 810 is a server coupled to a network providing video conferencing or network conferencing. An exemplary set of programmed instructions for face detection operations described with reference to FIGS. 1–8 is included as appendix A.

Advantageously, the systems and methods described with reference to the FIGURES provide various exemplary embodiments for facial image detection. These systems and methods do not rely or depend on high quality, structured video content. Other advantages of the systems and methods include the use of motion computations that can be based on previous frames of video rather than on a reference frame. Additionally, instead of using a user-specific color model requiring training data for each person in the video, the systems and methods described can use a general color model.

The systems and methods described with reference to the FIGURES can be configured for a variety of different uses. For example, uses include detecting the occurrence of people in a video sequence or for tracking people in a video sequence. As such, the systems and methods described can be used for security and surveillance applications. Another use is for segmenting video sequences based on the number of people in the scene changing.

The systems and methods described with reference to the FIGURES can also be used for more efficient video retrieval. For example, a video clip can be quickly reviewed and occurrences of people in the video clip identified. Another use is for choosing key frames for a video segment. Frames with faces and text are often the most representative of the entire video segment.

While the embodiments illustrated in the FIGURES and described above are presently preferred, it should be understood that these embodiments are offered by way of example only. Other embodiments may include additional procedures or steps not described here. Other applications not specifically discussed here (e.g., the inclusion of a facial detection system in a public location, such as an airport or bus station as well as in common areas of a building) may also be included. The invention is not limited to a particular embodiment, but extends to various modifications, combinations, and permutations that nevertheless fall within the scope and spirit of the appended claims.

What is claimed is:

1. A method of detecting a human feature from a video, the method comprising:
   obtaining a first video frame of images and a second video frame of images, the second video frame of images being later in time than the first video frame of images;
   performing a luminance conversion on the first video frame of images and the second video frame of images;
   performing a motion filter operation on the converted first and second frames of images;
   performing a chrominance normalization on the second video frame of images;
   performing a color filter operation on the normalized second video frame of images; and
   processing the first and second frames of video images after the motion filter and color filter operations.

2. The method of claim 1, wherein processing the first and second frames of video images after the motion filter and color filter operations includes morphological filtering.

3. The method of claim 2, further comprising performing an AND operation of the morphological filtered first frame of video images and the morphological filtered second frame of video images.

4. The method of claim 1, wherein performing a chrominance normalization includes removing brightness from the second frame of video images.

5. The method of claim 1, wherein performing a luminance conversion on the first video frame of images and the second video frame of images includes examining brightness and not color in the first and second frames of video images.

6. The method of claim 1, wherein processing the first and second frames of video images after the motion filter and color filter operations includes applying heuristic rules.

7. The method of claim 6, wherein the heuristic rules are applied to a combination of the first and second frames of video images.

8. The method of claim 7, wherein heuristic rules include conditions typical to faces in a teleconferencing scene.

9. The method of claim 1, wherein the first and second frames of video images are frames from low-quality video.

10. The method of claim 1, wherein low-quality video is video that contains features with less than 60×60 pixel resolution.

11. A system operable to detect feature images in video, the system comprising:
    a central processing unit (CPU); and
    a storage device coupled to the CPU and having stored there information for configuring the CPU to:
       obtain video frames of images;
       perform a luminance conversion on a first and a second frame of the video frames of images, the second frame being later in time than the first frame;
       perform a motion filter operation on the converted first and second frames;
       perform a chrominance normalization on the second frame;
       perform a color filter operation on the normalized second frame; and
       process the first and second frames after the motion filter and color filter operations.

12. The system of claim 11, wherein the CPU is configured to communicate over a network.

13. The system of claim 12, wherein the network is the Internet.

14. The system of claim 11, wherein the storage device further includes information for configuring the CPU to morphologically filter the first frame after motion filtering with the second frame and the second frame after color filtering.

15. The system of claim 14, wherein morphologically filtering includes morphological cleaning, morphological labeling, and morphological closing.

16. The system of claim 11, wherein multiple frames of images on a videoconference are used as the first and second frames of the video frames of images.

17. The system of claim 11, wherein the color filter operation involves use of a general color model.

18. An orientation invariant feature detection system for unstructured low-quality video, the system comprising:
    means for obtaining a first video frame of images and a second video frame of images, the second video frame of images being later in time than the first video frame of images;
    means for performing a luminance conversion on the first video frame of images and the second video frame of images;
    means for performing a motion filter operation on the converted first and second frames of images;
    means for performing a chrominance normalization on the second video frame of images;
    means for performing a color filter operation on the normalized second video frame of images; and
    means for processing the first and second frames of video images after the motion filter and color filter operations.

19. The system of claim 18, wherein means for performing a color filter operation on the normalized second video frame of images includes using a Gaussian model of skin color independent of a specific person.

20. The system of claim 18, wherein means for processing the first and second frames of video images after the motion filter and color filter operations includes applying heuristic rules.

* * * * *